US011636204B2

(12) United States Patent
Strogov et al.

(10) Patent No.: US 11,636,204 B2
(45) Date of Patent: Apr. 25, 2023

(54) SYSTEMS AND METHODS FOR COUNTERING REMOVAL OF DIGITAL FORENSICS INFORMATION BY MALICIOUS SOFTWARE

(71) Applicant: Acronis International GmbH, Schaffhausen (CH)

(72) Inventors: Vladimir Strogov, Moscow (RU); Oleg Ishanov, Moscow (RU); Alexey Dod, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 233 days.

(21) Appl. No.: 17/005,478

(22) Filed: Aug. 28, 2020

(65) Prior Publication Data

US 2021/0097182 A1 Apr. 1, 2021

Related U.S. Application Data

(60) Provisional application No. 62/908,742, filed on Oct. 1, 2019.

(51) Int. Cl.
*G06F 21/56* (2013.01)
*G06F 21/55* (2013.01)

(52) U.S. Cl.
CPC ......... *G06F 21/566* (2013.01); *G06F 21/554* (2013.01); *G06F 2221/033* (2013.01)

(58) Field of Classification Search
CPC ... G06F 21/52; G06F 21/56; G06F 2221/2101
See application file for complete search history.

(56) References Cited

U.S. PATENT DOCUMENTS 10,616,411 B1 * 4/2020 Chang ................. H04M 3/2281
2015/0082441 A1 * 3/2015 Gathala ............... H04L 63/1441
726/25

(Continued)

FOREIGN PATENT DOCUMENTS

WO WO-2019160427 A1 * 8/2019 ......... H04L 63/1416

OTHER PUBLICATIONS

Lengyel et al., Scalability, Fidelity and Stealth in the DRAKVUF Dynamic Malware Analysis System, ACM 978-1-4503-3005-3/14/12 (Year: 2012).*

(Continued)

*Primary Examiner* — Matthew Smithers
*Assistant Examiner* — Shu Chun Gao
(74) *Attorney, Agent, or Firm* — ArentFox Schiff LLP; Michael Fainberg

(57) ABSTRACT

Disclosed herein are systems and methods for preventing anti-forensics actions. In one exemplary aspect, a method may identify a suspicious object from a plurality of objects on a computing device and monitor actions performed by the suspicious object. The method may intercept a first command by the suspicious object to create and/or modify a digital artifact on the computing device and subsequent to intercepting the first command, intercept a second command by the suspicious object to delete at least one of the suspicious object and the digital artifact. In response to intercepting both the first command to create and/or modify the digital artifact and the second command to delete at least one of the suspicious object and the digital artifact, the method may block the second command, and may store the suspicious object and the digital artifact in a digital repository.

17 Claims, 4 Drawing Sheets

(56) References Cited

U.S. PATENT DOCUMENTS

2018/0144134 A1     5/2018  Liao et al.
2020/0042698 A1*    2/2020  Urias ..................... G06F 9/545

OTHER PUBLICATIONS

Tamas K Lengyel et al: "Scalability, fidelity and stealth in the DRAKVUF dynamic malware analysis system", Proceedings of the 30th Annual Computer Security Applications Conference, (Dec. 8, 2014), pp. 386-395.
Botacin Marcus Felipe et al: "The other guys: automated analysis of marginalized malware", Journal of Computer Virology and Hacking Techniques, Springer Paris, Paris, vol. 14, No. 1, (Feb. 27, 2017), pp. 87-98.

* cited by examiner

SYSTEMS AND METHODS FOR COUNTERING REMOVAL OF DIGITAL FORENSICS INFORMATION BY MALICIOUS SOFTWARE

CROSS-REFERENCE TO RELATED APPLICATIONS

This application claims the benefit of U.S. Provisional Application No. 62/908,742, filed Oct. 1, 2019, which is herein incorporated by reference.

FIELD OF TECHNOLOGY

The present disclosure relates to the field of data security, and, more specifically, to systems and methods for preventing actions by suspicious objects that counteract digital forensics investigations.

BACKGROUND

As the reliance on digital computing has increased, the amount of cybercrimes such as hacking, data theft, and malware attacks, has followed suit. Accordingly, cyber security methods have shifted their focus to tracking malicious software for analysis after an attack has occurred. Certain advanced malicious software, however, not only corrupt, steal data, encrypt files, etc., but also remove all traces of their presence from a computer system. Having done their malicious actions, malicious software can self-destruct and prevent their activities from being tracked, thus making subsequent attempts at digital investigation extremely difficult or even impossible.

Conventional counteraction methods, which employ anti-rootkit programs, are not specialized enough to fully take into account the advanced nature of such malicious software. Anti-rootkit programs are able to detect specific malicious software, but they are not intended to save information about the activity of rootkits and their artifacts. In this regard, a specialized solution is required that would prevent the destruction, erasure, and concealment of traces of a malicious software's activities.

SUMMARY

To address these shortcomings, the present disclosure describes methods and systems for preventing actions by suspicious objects that counteract digital forensics investigations.

In one exemplary aspect, the method may identify a suspicious object from a plurality of objects on a computing device and monitor actions performed by the suspicious object, wherein the actions comprise commands and requests originating from the suspicious object. The method may intercept a first command by the suspicious object to create and/or modify a digital artifact on the computing device and subsequent to intercepting the first command, intercept a second command by the suspicious object to delete at least one of the suspicious object and the digital artifact. In response to intercepting both the first command to create and/or modify the digital artifact and the second command to delete at least one of the suspicious object and the digital artifact, the method may block the second command, and may store the suspicious object and the digital artifact in a digital repository.

In some aspects, the method may store contents of the digital repository with a backup of system and user data on the computing device.

In some aspects, the method may store respective locations of the suspicious object and the digital artifact in the digital repository.

In some aspects, the method may store a record of all monitored actions of the suspicious object in the digital repository.

In some aspects, the method may identify the suspicious object from the plurality of objects on the computing device by: for each respective object of the plurality of objects, extracting a digital signature of the respective object, determining whether the digital signature of the respective object matches any trusted digital signature in a whitelist of digital signatures, and in response to determining that no match exists, identifying the respective object as the suspicious object.

In some aspects, wherein a plurality of suspicious objects are identified, the method may monitor the plurality of suspicious objects for a threshold period of time, wherein the plurality of suspicious objects comprises the suspicious object. The method may further identify a subset of the suspicious objects that have not performed, over the threshold period of time, actions that degrade a performance of the computing device or compromise user privacy on the computing device. The method may determine that the subset of the suspicious objects are not suspicious, and may cease monitoring of the subset.

In some aspects, the method may detect that the digital artifact has created and/or modified another digital artifact on the computing device. In response to intercepting a third command by one of the digital artifact and the another digital artifact to delete the suspicious object, the method may block the third command, and store the suspicious object, the digital artifact, and the another digital artifact in the digital repository.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating and storing forensics-specific metadata. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
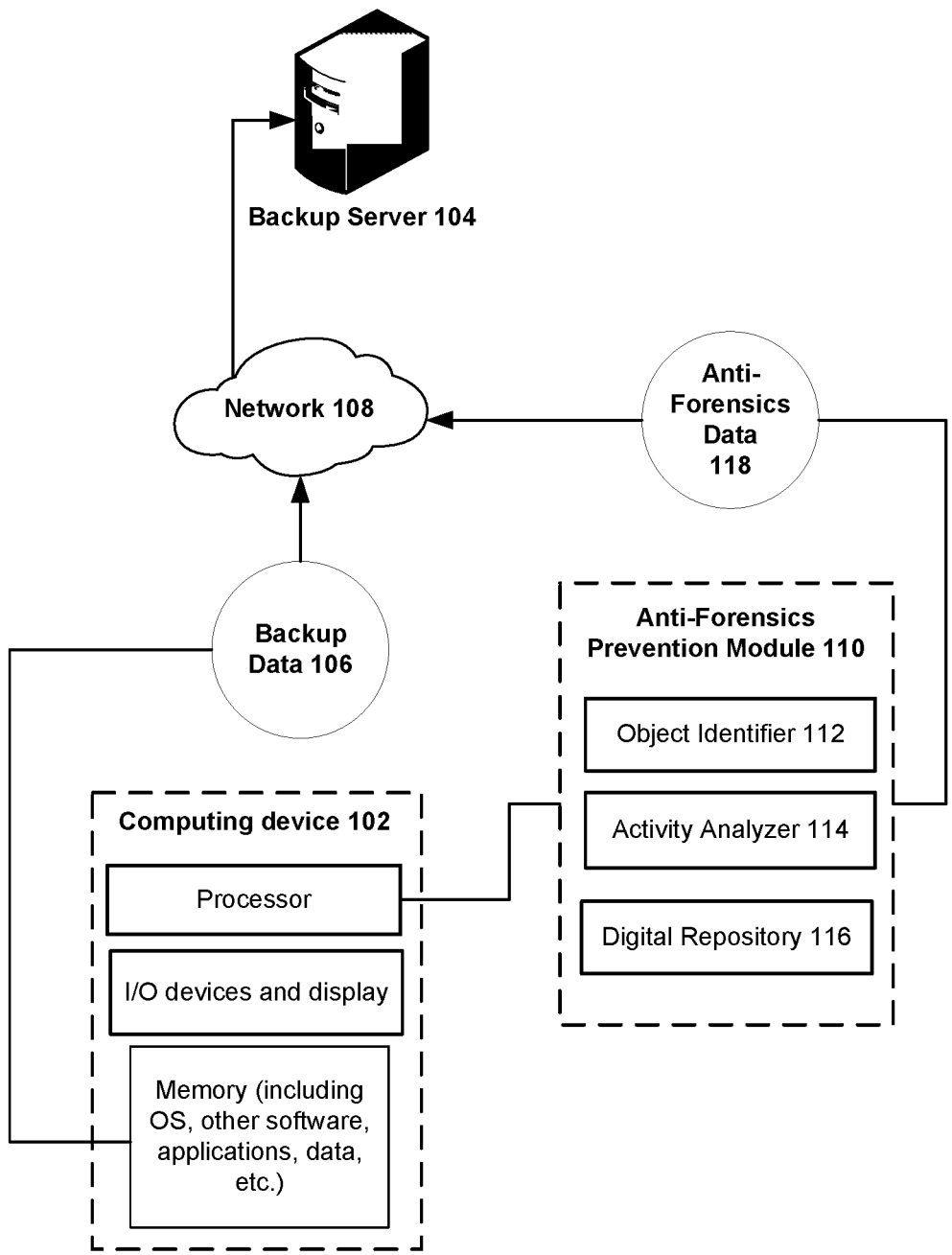
FIG. 1 is a block diagram illustrating a system for countering removal of digital forensics information by malicious software, in accordance with aspects of the present disclosure.

FIG. 1 is a block diagram illustrating system 100 for preventing anti-forensics actions by suspicious objects. The system 100 includes computing device 102, which may comprise a personal computer, server, etc., that includes a computer processing unit ("CPU"), and a memory that includes software for performing various tasks (e.g., Operating System (OS) software, application software, etc.). Data for computing device 102 may be stored in the memory of the device itself as well as on other external devices such as backup server 104, a compact disk, flash drive, optical disk, and the like.

In the present disclosure, backup data 106 originating from the memory of computing device 102 is transmitted to backup server 104 over network 108. Network 108 may be the Internet, a mobile phone network, a data network (e.g., a 4G or LTE network), Bluetooth, or any combination thereof. For example, backup server 104 may be part of a cloud computing environment accessed via the Internet, or may be part of a local area network (LAN) with computing device 102. The lines connecting backup server 104 and computing device 102 to network 108 represent communication paths, which may include any combination of free-space connections (e.g., for wireless signals) and physical connections (e.g., fiber-optic cables).

Figure 4:
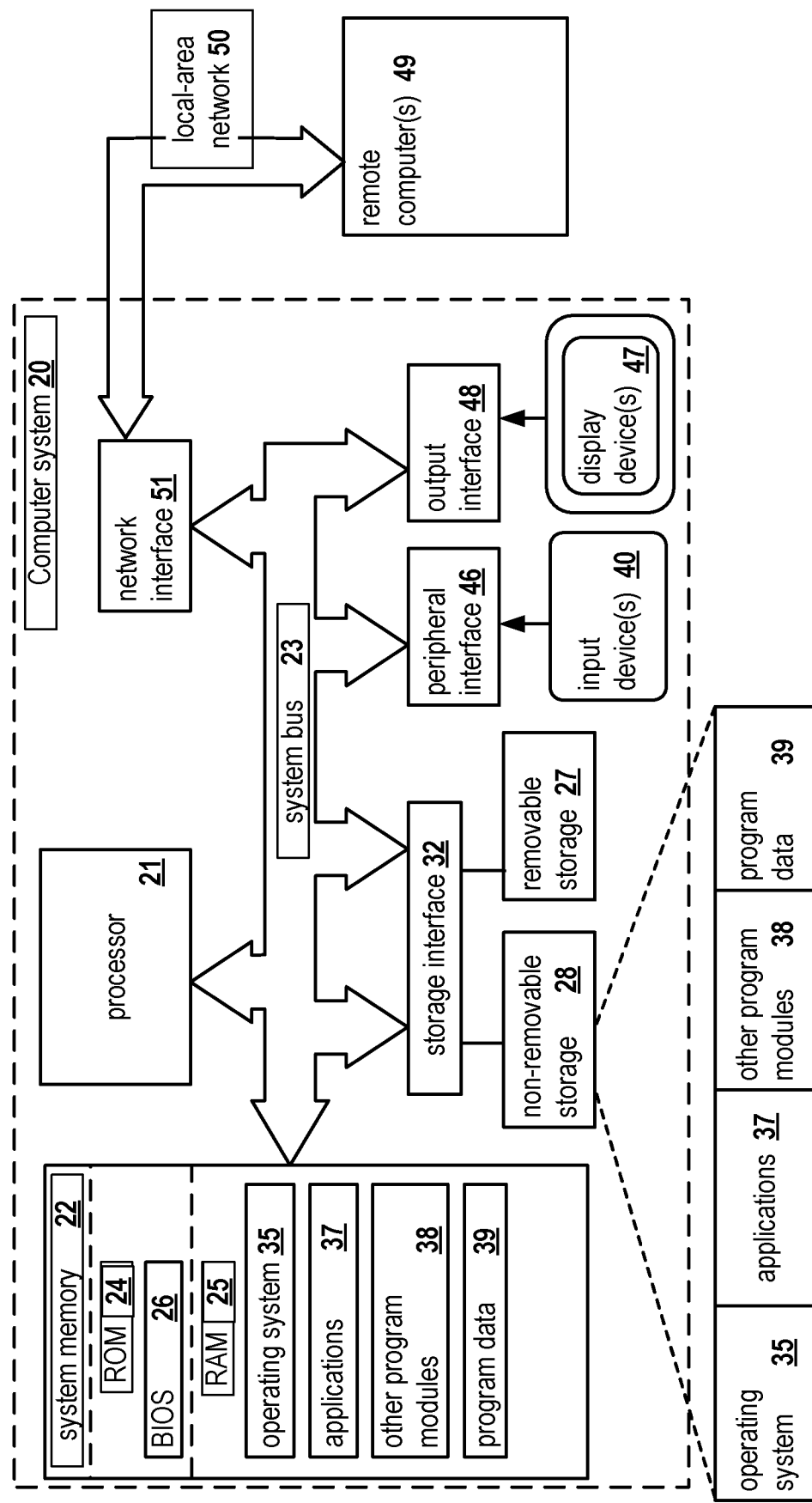
FIG. 4 presents an example of a general-purpose computer system on which aspects of the present disclosure can be implemented.

In should be noted that there may be more than one backup server 104, but only one is shown in FIG. 1 to avoid overcomplicating the drawing. For example, backup server 104 may represent a plurality of servers in a distributed cloud cluster. Backup server 104 may comprise any number of physical components (e.g., as shown in FIG. 4). For example, backup server 104 may comprise processors, physical block storage devices (e.g., Hard Disk Drives (HDDs), Solid State Drives (SSDs), flash drives, SMR disks, etc.) or memory (e.g., Random Access Memory (RAM)), I/O interface components, etc.

Backup data 106 may be any type of data including user data, applications, system files, preferences, documents, media, etc. Computing device 102 may send backup data 106 for storage in backup server 104 in accordance with a backup schedule that indicates the specific data to include in backup data 106 and the frequency at which the data should be backed up. For example, computing device 102 may generate a copy of a data file existing in the memory of computing device 102 and transmit the copy as backup data 106 to backup server 104 every other hour. Backup data 106 may be selected by a user of computing device 102 and the frequency of the backup schedule may also be selected by a user.

Anti-forensics prevention module 110 may be part of an intrusion detection system (IDS) software. Anti-forensics prevention module 110, as shown in FIG. 1 is a client-end software, but may also be divided into a thick and thin client between backup server 104 and computing device 102, respectively. In some aspects, anti-forensics prevention module 110 may be divided into at least three components: object identifier 112, activity analyzer 114, and digital repository 116. Object identifier 112 may be configured to identify suspicious objects from the plurality of objects in computing device 102. An object may be any application, process, thread, file, data structure, or portable executable (PE) file on computing device 102. Object identifier 112 may retrieve a list of all objects and identify the suspicious objects in the list. For example, object identifier 112 may retrieve a list of all objects on computing device 102 (e.g., by enumerating processes and threads, scanning for files and applications, etc.) in an initial scan. In some aspects, subsequent to the initial scan, whenever a new object is created on computing device 102 or an existing object is modified, object identifier 112 may evaluate/re-evaluate the suspiciousness of the new/modified object. In some aspects, to evaluate suspiciousness, object identifier 112 may compare the retrieved list of objects with a whitelist comprising objects that are trusted. Objects that are not in the whitelist are deemed suspicious by object identifier 112.

Among the objects that can become a subject of observation due to their suspiciousness are executable files and various kinds of dynamic libraries that can be injected into trusted processes (i.e., those found in the whitelist) using third-party malicious code, programs, scripts, etc. Object identifier 112 may also determine whether an object has a trusted digital signature to determine suspiciousness. A lack of a trusted digital signature may indicate to object identifier 112 that the object in question is a suspicious object. Object identifier 112 may analyze suspicious behavior of an object (e.g., injecting dynamic libraries into other processes that are deemed trusted) as well as network activity (e.g., unusual download/upload items, sources, and destinations).

Activity analyzer 114 may be configured to monitor actions performed by the suspicious object. Consider an example where the suspicious object is an executable file that generates another file. In this scenario, the action is the generation of another file. The another file is a digital artifact of the suspicious object. A digital artifact (also referred to as artifact) may be any application, process, thread, file, or data structure that is created/modified directly or indirectly by a suspicious object. In this example, because the another file is created by the action taken by the suspicious object, the another file is identified as a digital artifact by activity analyzer 114. In another example, if the executable file modified an existing file on computing device 102, activity analyzer 114 may identify the modified file as a digital artifact. In both examples, the suspicious object is directly creating/modifying a digital artifact. In the case of indirect creation/modification, the suspicious object may inject code into a trusted object (making it a digital artifact), and the object with the injected code may modify/create an additional object, which is also considered a digital artifact. While the suspicious object did not create/modify the additional object directly, because it was created/modified by an object that the suspicious object directly affected, the additional object is considered a digital artifact. Therefore, an indirectly affected digital artifact may be any digital artifact that is affected by consequential action of the suspicious object, even though the suspicious object did not specifically target the digital artifact. Thus, in some aspects, activity analyzer 114 may also monitor actions involving the suspicious object (but not directly performed by suspicious object).

Activity analyzer 114 may specifically detect actions to create or modify by intercepting commands by the suspicious objects. Once activity analyzer 114 has identified the suspicious object and the digital artifact, activity analyzer 114 determines whether any subsequent commands by the suspicious object or a digital artifact involve deleting either the suspicious object itself or the created/modified digital artifact. Because the suspicious object is identified as being suspicious and the command involves deleting a suspicious object (self-destruct) or at least one digital artifact of the suspicious object, activity analyzer 114 may mark the suspicious object as malware that is trying to remove traces of itself. Anti-forensics prevention module 110 may thus block the deletion command.

Consider an example in which malware attacks computing device 102. The malware may have characteristics similar to "Flame," a modular computer malware discovered in 2012. The characteristics may include the ability to record audio, take screenshots, monitor keyboard activity, track network activity, etc. The malware may use a variety of encryption methods and may store acquired structured information in a SQLite database. Just as "flame" identifies the antivirus software installed on a target device and adapts its own behavior to circumvent the antivirus software's security (e.g., by changing filename extensions), the malware may attempt to trick security systems on computing device 102. Furthermore, the malware may have a "kill" function, similar to "flame," that eliminates all traces of its files and operation from the system.

Because the antivirus software may not have a definition for such malware (as it may be novel), it will be ineffective in detection. "Flame" is a program that is roughly 20 MB in size. When a scan of objects is ran by object identifier 112, the malware program will be detected as an object. In some aspects, because the object is not found in a whitelist, it will be treated as a suspicious object by anti-forensics prevention module 110. The copied screenshots, audio, and other tracked information by the malware are identified as digital artifacts by analyzer 114. Furthermore, the malware's attempt to "kill" the acquired copies such that the malware cannot be traced on computing device 102 is deemed a deletion command. In response to intercepting the kill command, anti-forensics prevention module 110 may block the command from being executed because the malware is considered a suspicious object.

It should be noted that several objects may be characterized as suspicious objects, even if they are ultimately harmless objects. In some aspects, to reduce the amount of resources devoted to monitoring a plurality of suspicious objects that are harmless, object identifier 112 may deem that a previously identified suspicious object is no longer a suspicious object after a threshold time period has expired throughout which the object has not interacted with other objects on computing device 102, the object has not performed harmful actions that degrade the performance of computing device 102 (e.g., by utilizing more than a threshold of CPU power, RAM, storage, etc., for more than a predetermined amount of time), or the object has not compromised user privacy on computing device 102 (e.g., by monitoring, saving, and sending data elsewhere).

Anti-forensics prevention module 110 may further store the suspicious object and the digital artifact(s) (together making up anti-forensics data 118) in digital repository 116. Digital repository 116 may be configured as an isolated storage (e.g., a quarantine) that prevents the suspicious object from making additional commands. In some aspects, anti-forensics prevention module 110 may generate anti-forensics data 118. Anti-forensics data 118 is backup data that includes the contents of digital repository 116 (i.e., the suspicious object and the digital artifact) as well as information such as (1) the respective locations of the suspicious object and the digital artifact in memory of computing device 102 and (2) all monitored actions of the suspicious object as tracked by activity analyzer 114. In some aspects, the information listed above is stored in the digital repository 116 along with the suspicious object and the digital artifact.

In some aspects, anti-forensics prevention module 110 may further encrypt the suspicious object and the digital artifact (e.g., using algorithms such as Advanced Encryption Standard (AES), Rivest-Shamir-Adleman (RSA), etc.) before placing them in digital repository 116. This prevents a third-party application from somehow accessing the suspicious object or the digital artifact and removing the traces. In an example where the object and artifacts are signed by a public key, the private key may be stored on a device that is not computing device 102 to improve security.

In some aspects, anti-forensics data 118 is stored with backup data 106 in backup server 104. For example, when backup data 106 is uploaded periodically, anti-forensics data 118 is backed up as well. This allows for a forensics engineer that is conducting a forensics investigation to recreate the state of computing device 102 and analyze the effects of the suspicious object and the digital artifact provided their respective locations in memory of computing device 102 (before being quarantined in digital repository 116). The state of computing device 102 may represent a completely restored image of the volume of computing device 102, and metadata about the computer crime or virus attack, including the time of the event, the sources of malicious actions, the replay of damaged or infected data.

Figure 2:
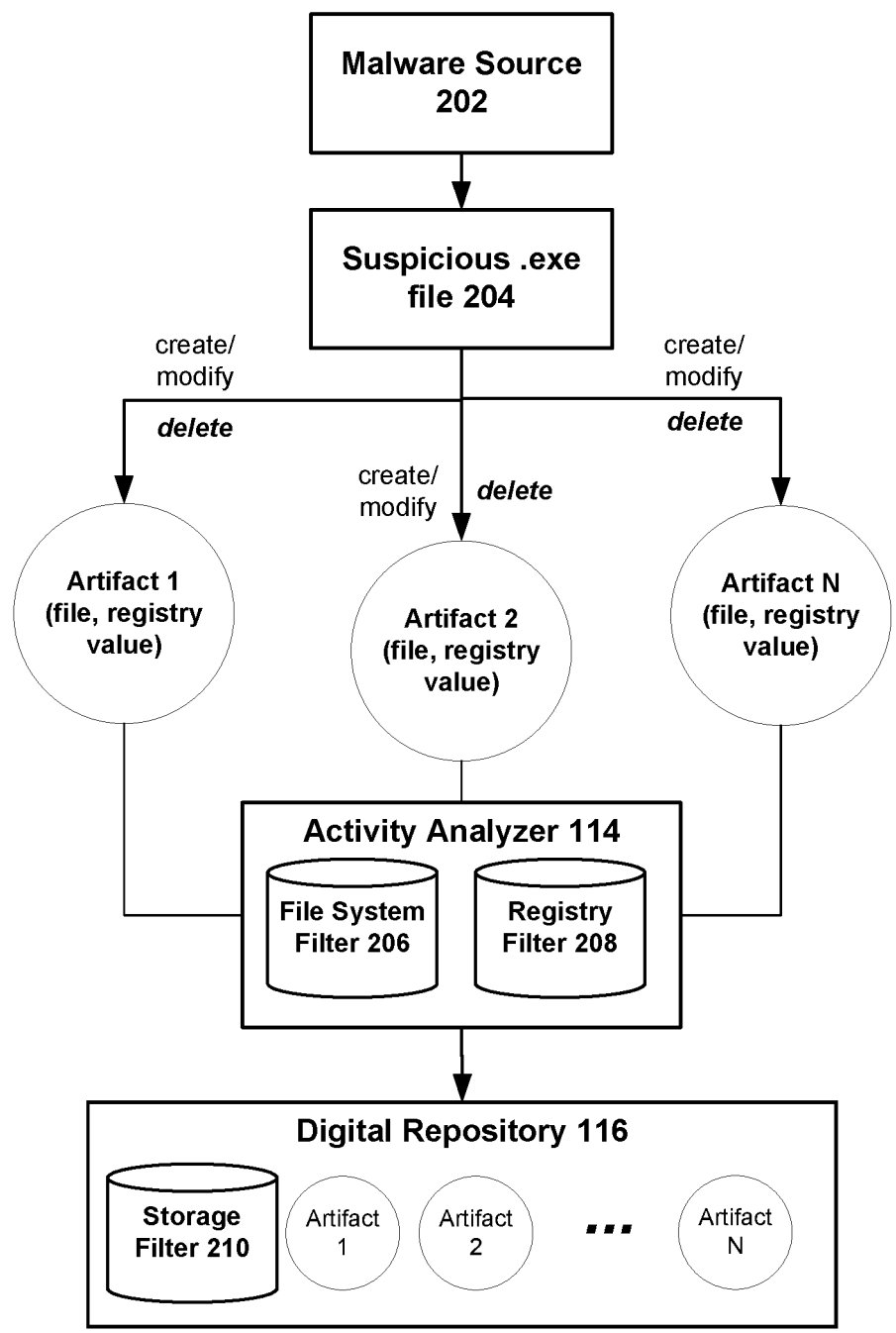
FIG. 2 is a block diagram illustrating a method for monitoring activity by suspicious objects, in accordance with aspects of the present disclosure.

FIG. 2 is a block diagram illustrating method 200 for monitoring activity by suspicious objects, in accordance with aspects of the present disclosure. Malware source 202 may be the origin of suspicious .exe file 204. Suppose that object identifier 112 has already identified suspicious .exe file 204 as a suspicious object. Suspicious .exe file 204 may create and/or modify a plurality of artifacts (e.g., artifact 1, 2, . . . . N). Activity analyzer 114 may intercept attempts to create/modify and subsequently delete any of the artifacts or suspicious .exe file 204.

Activity analyzer 114 may contain two filters, namely, file system filter 206 and registry filter 208. In some aspects, file system filter 206 scans for new artifacts in the memory of computing device 102 and detects removal of artifacts from the memory. For example, when a file is created using the New Technology File System (NTFS), a record about the file is added to the Master File Table (MFT). The MFT is a database in which information about all files and directories on an NTFS volume is stored. File system filter 206 may monitor for changes in the MFT to detect the addition and removal of digital artifacts.

Registry filter 208 may be configured to monitor changes to the registry of computing device 102. Before an application can add data to the registry of a system, the application needs to create or open a key. In a Windows operating system, the application may use functions such as RegOpenKeyEx or RegCreateKeyEx to perform this task. Registry filter 208 may monitor a command line for these functions, as executed by a suspicious object. The suspicious object may use the function RegSetValueEx to associate a value and its data with the opened/created key. When intercepting commands, activity analyzer 114 may monitor (via registry filter 208) for this combination of functions. As shown in FIG. 2, each artifact has a file and registry value that the activity analyzer 114 may track. Subsequent to the creation/modification of a file identified as a digital artifact, activity analyzer 114 monitors for attempts to delete the file or suspicious .exe file 204. For example, registry filter 208 may monitor for an attempt to execute the function RegDeleteKey or RegDeleteValue. The first of these functions is used to delete a key from the registry and the second of these functions is used to delete a value from a key. To prevent an attempt to hide traces of its actions, activity analyzer 114 may prevent the functions from being executed.

Activity analyzer 114 may further quarantine suspicious .exe file 204 and artifacts 1, 2, . . . . N in digital repository 116. Digital repository 116 may comprise storage filter 210 which is intended to provide an efficient way to store collected objects and artifacts, including the information about volume state (i.e., a volume map), to understand where the objects and artifacts were located initially (e.g., physical addresses on a volume on computing device 102).

Figure 3:
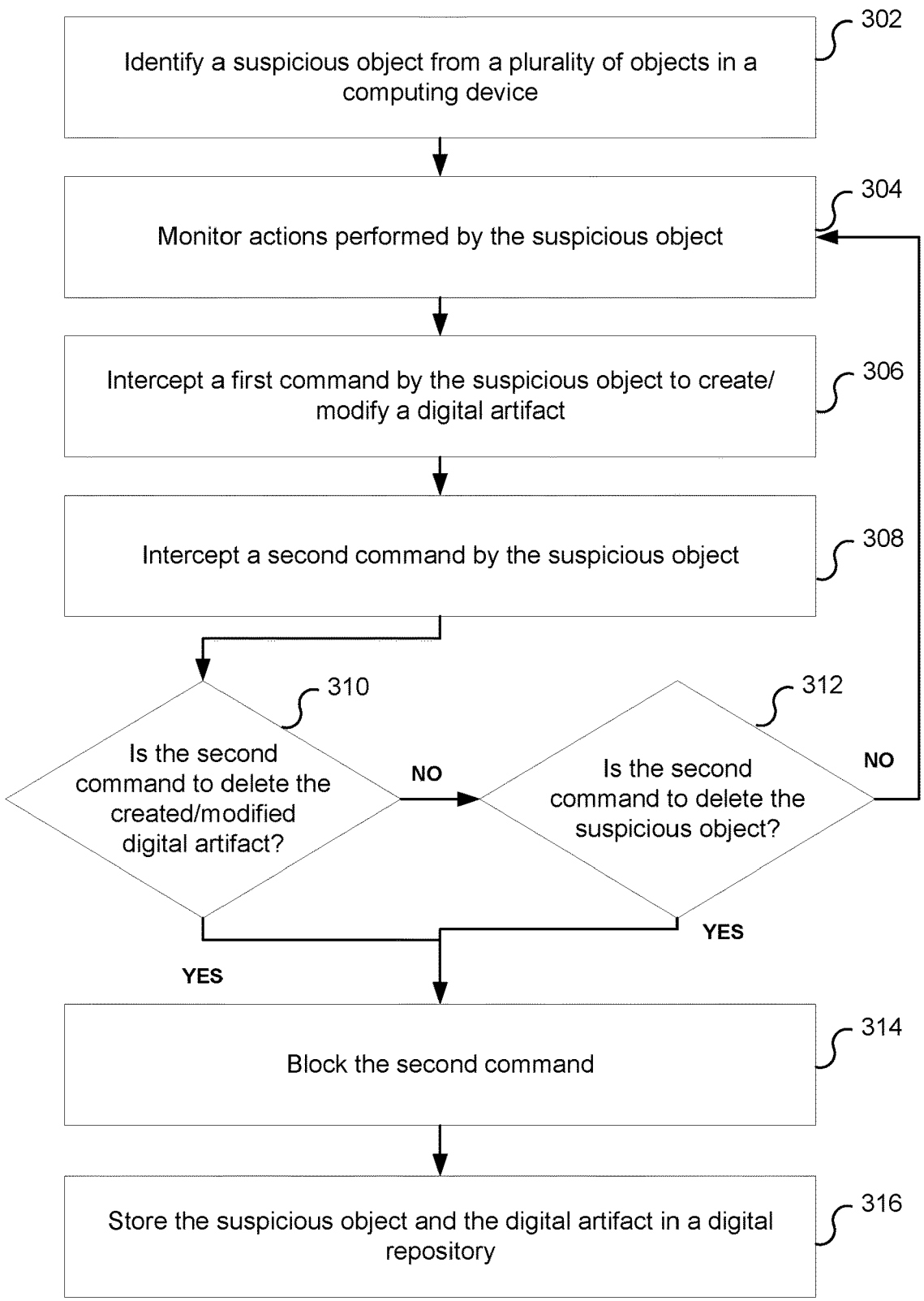
FIG. 3 illustrates a flow diagram of a method for blocking an attempt to delete a suspicious object and/or its artifact, in accordance with aspects of the present disclosure.

FIG. 3 illustrates a flow diagram of method 300 for blocking an attempt to delete a suspicious object and/or its artifact, in accordance with aspects of the present disclosure. At 302, object identifier 112 identifies a suspicious object from a plurality of objects in computing device 102. For example, for each respective object of the plurality of objects, object identifier 112 may extract a digital signature of the respective object and may determine whether the digital signature of the respective object matches any trusted digital signature in a whitelist of digital signatures. In response to determining that no match exists, object identifier 112 may identify the respective object as a suspicious object.

At 304, activity analyzer 114 monitors actions performed by the suspicious object (e.g., using file system filter 206 and registry filter 208). At 306, activity analyzer 114 intercepts a first command by the suspicious object to create and/or modify a digital artifact on computing device 102.

At 308, activity analyzer 114 intercepts a second command by the suspicious object. At 310, activity analyzer 114 determines whether the second command is to delete the created/modified digital artifact. In response to determining that the second command is not to delete the created/modified digital artifact, method 300 proceeds to 312, where activity analyzer 114 determines whether the second command is to delete the suspicious object itself.

In response to determining that the second command is not to delete the suspicious object, method 300 returns to 304, where activity analyzer 114 continues to monitor actions performed by the suspicious object. However, if at 310, activity analyzer 114 determines that the second command is to delete the created/modified digital artifact, or if at 312 activity analyzer 114 determines that the second command is to delete the suspicious object, method 300 proceeds to 314. Here, anti-forensics prevention module 110 blocks the second command. At 316, anti-forensics prevention module 110 stores the suspicious object and the digital artifact in digital repository 116.

FIG. 4 is a block diagram illustrating a computer system 20 on which aspects of systems and methods for anti-forensics prevention may be implemented in accordance with an exemplary aspect. The computer system 20 may represent computing device 102 and/or backup server 104 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of methods 200-300 performed by anti-forensics prevention module 110 (e.g., via its components such as object identifier 112) may be executed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preventing anti-forensics actions, the method comprising:
    monitoring, from a plurality of objects on a computing device, a plurality of suspicious objects for a threshold period of time;
    identifying a subset of the suspicious objects that have not performed, over the threshold period of time, actions that degrade a performance of the computing device or compromise user privacy on the computing device;
    determining that the subset of the suspicious objects are not suspicious;
    ceasing monitoring of the subset;
    identifying a suspicious object from the plurality of suspicious objects not in the subset;
    monitoring actions performed by the suspicious object, wherein the actions comprise commands and requests originating from the suspicious object;
    intercepting a first command by the suspicious object to create and/or modify a digital artifact on the computing device;
    subsequent to intercepting the first command, intercepting a second command by the suspicious object to delete at least one of the suspicious object and the digital artifact;
    in response to intercepting both the first command to create and/or modify the digital artifact and the second command to delete at least one of the suspicious object and the digital artifact:
        blocking the second command; and
        storing the suspicious object and the digital artifact in a digital repository.

2. The method of claim 1, further comprising:
    storing contents of the digital repository with a backup of system and user data on the computing device.

3. The method of claim 1, further comprising:
    storing respective locations of the suspicious object and the digital artifact in the digital repository.

4. The method of claim 1, further comprising:
    storing a record of all monitored actions of the suspicious object in the digital repository.

5. The method of claim 1, wherein identifying the suspicious object from the plurality of objects on the computing device comprises:
    for each respective object of the plurality of objects:
        extracting a digital signature of the respective object;
        determining whether the digital signature of the respective object matches any trusted digital signature in a whitelist of digital signatures; and
        in response to determining that no match exists, identifying the respective object as the suspicious object.

6. The method of claim 1, further comprising:
    detecting that the digital artifact has created and/or modified another digital artifact on the computing device;
    in response to intercepting a third command by one of the digital artifact and the another digital artifact to delete the suspicious object:
        blocking the third command; and
        storing the suspicious object, the digital artifact, and the another digital artifact in the digital repository.

7. A system for preventing anti-forensics actions, the system comprising:
    a hardware processor configured to:
        monitor, from a plurality of objects on a computing device, a plurality of suspicious objects for a threshold period of time;
        identify a subset of the suspicious objects that have not performed, over the threshold period of time, actions that degrade a performance of the computing device or compromise user privacy on the computing device;
        determine that the subset of the suspicious objects are not suspicious;
        cease monitoring of the subset;
        identify a suspicious object from the plurality of suspicious objects not in the subset;
        monitor actions performed by the suspicious object, wherein the actions comprise commands and requests originating from the suspicious object;
        intercept a first command by the suspicious object to create and/or modify a digital artifact on the computing device;
        subsequent to intercepting the first command, intercept a second command by the suspicious object to delete at least one of the suspicious object and the digital artifact;
        in response to intercepting both the first command to create and/or modify the digital artifact and the second command to delete at least one of the suspicious object and the digital artifact:
            block the second command; and
            store the suspicious object and the digital artifact in a digital repository.

8. The system of claim 7, wherein the hardware processor is further configured to:
    store contents of the digital repository with a backup of system and user data on the computing device.

9. The system of claim 7, wherein the hardware processor is further configured to:
    store respective locations of the suspicious object and the digital artifact in the digital repository.

10. The system of claim 7, wherein the hardware processor is further configured to:
    store a record of all monitored actions of the suspicious object in the digital repository.

11. The system of claim 7, wherein the hardware processor is further configured to identify the suspicious object from the plurality of objects on the computing device by:
    for each respective object of the plurality of objects:
        extracting a digital signature of the respective object;
        determining whether the digital signature of the respective object matches any trusted digital signature in a whitelist of digital signatures; and
        in response to determining that no match exists, identifying the respective object as the suspicious object.

12. The system of claim 7, wherein the hardware processor is further configured to:
    detect that the digital artifact has created and/or modified another digital artifact on the computing device;
    in response to intercepting a third command by one of the digital artifact and the another digital artifact to delete the suspicious object:
        block the third command; and
        store the suspicious object, the digital artifact, and the another digital artifact in the digital repository.

13. A non-transitory computer readable medium storing thereon computer executable instructions for preventing anti-forensics actions, comprising instructions for:
- monitoring, from a plurality of objects on a computing device, a plurality of suspicious objects for a threshold period of time;
- identifying a subset of the suspicious objects that have not performed, over the threshold period of time, actions that degrade a performance of the computing device or compromise user privacy on the computing device;
- determining that the subset of the suspicious objects are not suspicious;
- ceasing monitoring of the subset;
- identifying a suspicious object from the plurality of suspicious objects not in the subset;
- monitoring actions performed by the suspicious object, wherein the actions comprise commands and requests originating from the suspicious object;
- intercepting a first command by the suspicious object to create and/or modify a digital artifact on the computing device;
- subsequent to intercepting the first command, intercepting a second command by the suspicious object to delete at least one of the suspicious object and the digital artifact;
- in response to intercepting both the first command to create and/or modify the digital artifact and the second command to delete at least one of the suspicious object and the digital artifact:
  - blocking the second command; and
  - storing the suspicious object and the digital artifact in a digital repository.

14. The non-transitory computer readable medium of claim 13, further comprising instructions for:
- storing contents of the digital repository with a backup of system and user data on the computing device.

15. The non-transitory computer readable medium of claim 13, further comprising instructions for:
- storing respective locations of the suspicious object and the digital artifact in the digital repository.

16. The non-transitory computer readable medium of claim 13, further comprising instructions for:
- storing a record of all monitored actions of the suspicious object in the digital repository.

17. The non-transitory computer readable medium of claim 13, wherein the instructions for identifying the suspicious object from the plurality of objects on the computing device further comprises instructions for:
- for each respective object of the plurality of objects:
  - extracting a digital signature of the respective object;
  - determining whether the digital signature of the respective object matches any trusted digital signature in a whitelist of digital signatures; and
  - in response to determining that no match exists, identifying the respective object as the suspicious object.

* * * * *